(12) United States Patent
Yamamoto

(10) Patent No.: US 7,940,327 B2
(45) Date of Patent: May 10, 2011

(54) IMAGE-PICKUP APPARATUS

(75) Inventor: Harushige Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 1111 days.

(21) Appl. No.: 11/622,522

(22) Filed: Jan. 12, 2007

(65) Prior Publication Data

US 2007/0177052 A1 Aug. 2, 2007

(30) Foreign Application Priority Data

Jan. 12, 2006 (JP) ................. 2006-004824

(51) Int. Cl.
*H04N 5/225* (2006.01)
*H04N 9/47* (2006.01)

(52) U.S. Cl. ...................................... 348/373; 348/151

(58) Field of Classification Search .................. 348/373, 348/374, 168, 333.06, 376, 167, 151
See application file for complete search history.

(56) References Cited

U.S. PATENT DOCUMENTS

| 6,029,017 | A | * | 2/2000 | Miyazawa et al. | 396/532 |
| 6,144,406 | A | * | 11/2000 | Girard et al. | 348/211.4 |
| 6,330,400 | B1 | * | 12/2001 | Bittner et al. | 396/72 |
| 6,624,845 | B2 | * | 9/2003 | Loyd et al. | 348/151 |
| 6,992,699 | B1 | * | 1/2006 | Vance et al. | 348/207.99 |
| 7,129,971 | B2 | * | 10/2006 | McCutchen | 348/37 |

FOREIGN PATENT DOCUMENTS

JP 08-292357 11/1996

* cited by examiner

*Primary Examiner* — David L Ometz
*Assistant Examiner* — Ahmed A Berhan
(74) *Attorney, Agent, or Firm* — Canon U.S.A., Inc. I.P. Division

(57) ABSTRACT

An image-pickup apparatus is disclosed which has a small size while it is capable of driving its image-pickup optical system in at least one of tilting and panning directions. The image-pickup apparatus includes an image-pickup unit which houses an image-pickup optical system and an image-pickup element that photoelectrically coverts an object image formed by the image-pickup optical system thereinside, a support member which rotatably supports the image-pickup unit, and an actuator which is housed inside the image-pickup unit and rotationally drives the image-pickup unit relative to the support member.

6 Claims, 12 Drawing Sheets

IMAGE-PICKUP APPARATUS

BACKGROUND OF THE INVENTION

The present invention relates to an image-pickup apparatus capable of at least one of tilt imaging and pan imaging.

Japanese Patent Laid-Open No. H08(1996)-292357 has disclosed an image-pickup apparatus which has a mechanism for rotating a lens barrel including an image-pickup element in a tilting direction and a panning direction.

In the image-pickup apparatus, the lens barrel is mounted on a support mechanism rotatably in the tilting direction, and an actuator placed between the support mechanism and the lens barrel drives the lens barrel in the tilting direction relative to the support mechanism. This allows tilt imaging. In addition, the entire support mechanism can be driven by another actuator in the panning direction to allow panning imaging.

In the image-pickup apparatus disclosed in Japanese Patent Laid-Open No. H08(1996)-292357, however, the actuators for driving the lens barrel in the tilting direction and the panning direction are placed outside the lens barrel. For this reason, separate spaces are needed to dispose the lens barrel, the actuators, and the support mechanism, leading to an increased size of the image-pickup apparatus.

BRIEF SUMMARY OF THE INVENTION

The present invention provides an image-pickup apparatus which has a small size while it is capable of driving its image-pickup optical system in at least one of tilting and panning directions.

According to an aspect, the present invention provides an image-pickup apparatus includes an image-pickup unit which houses an image-pickup optical system and an image-pickup element that electrically converts an object image formed by the image-pickup optical system thereinside, a support member which rotatably supports the image-pickup unit, and an actuator which is housed inside the image-pickup unit and rotationally drives the image-pickup unit relative to the support member.

Other objects and features of the present invention will be apparent from the following description of a preferred embodiment with reference to the accompanying drawings.

DETAILED DESCRIPTION OF THE PREFERRED EMBODIMENTS

A preferred embodiment of the present invention will hereinafter be described with reference to the drawings.

Figure 1:
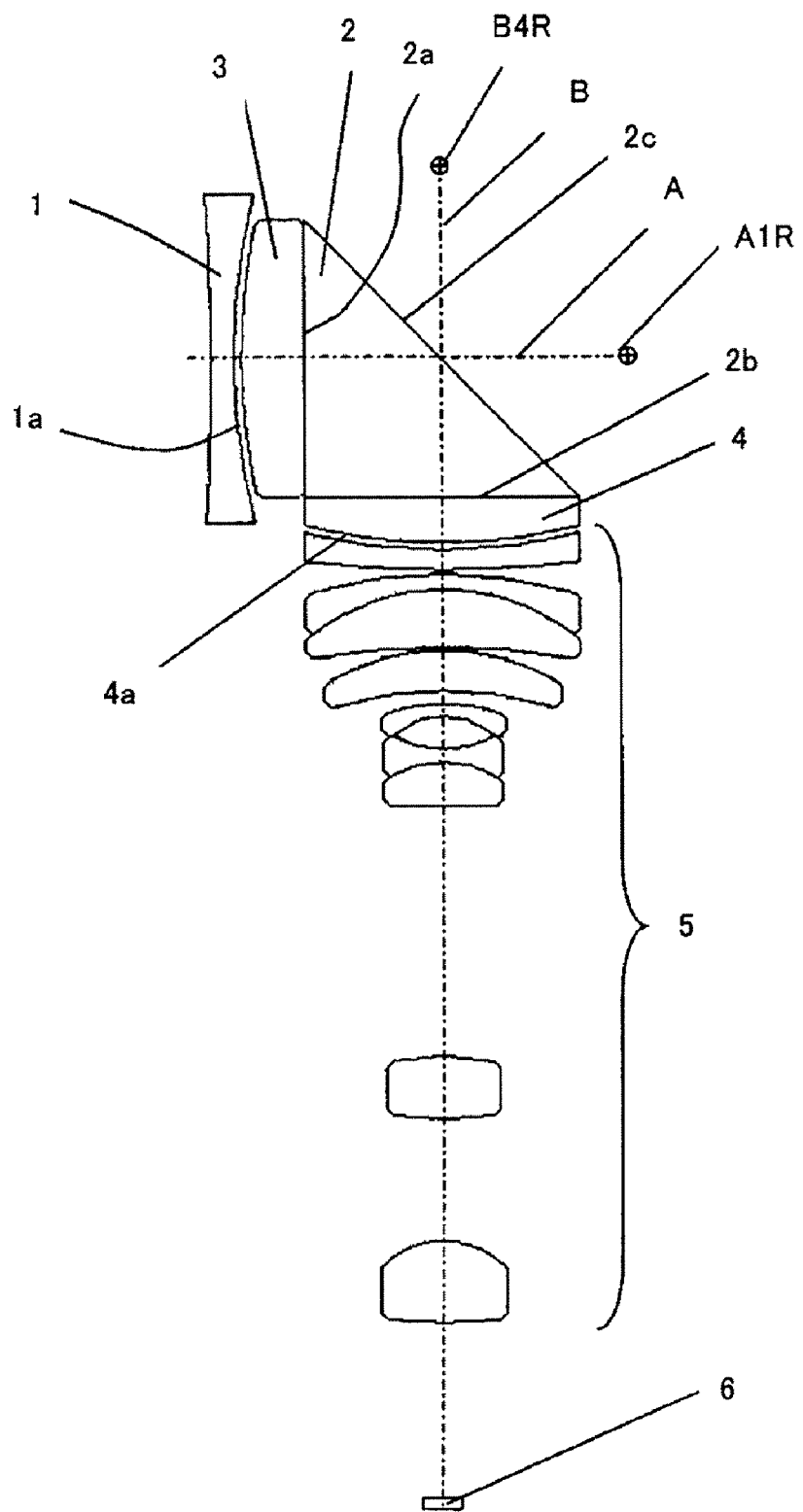
FIG. 1 is a section view of a reflective image-pickup optical system mounted on an image-pickup apparatus which is an embodiment of the present invention.

FIG. 1 shows the structure of a reflective image-pickup optical system mounted on an image-pickup apparatus which is an embodiment of the present invention.

In FIG. 1, reference character A shows an optical axis of part of the reflective image-pickup optical system closer to an object and the optical axis A will hereinafter be referred to as a first optical axis. Reference character B shows an optical axis of part of the reflective image-pickup optical system closer to an image plane and the optical axis B will hereinafter be referred to as a second optical axis, which is orthogonal to the first optical axis A.

Reference numeral 1 shows an objective lens placed closest to the object on the first optical axis A. Reference numeral 2 shows a prism serving as a reflecting member which bends the first optical axis A by 90 degrees and connects it to the second optical axis B. A first lens 3 is bonded to an entrance planar portion 2a of the prism 2 between the objective lens 1 and the prism 2. A second lens 4 is bonded to an emergence planar portion 2b of the prism 2.

Reference numeral 5 shows a lens system placed on the second optical axis B. Reference numeral 6 shows an image-pickup element such as a CCD sensor and a CMOS sensor which photoelectrically converts a subject image (object image) formed by the reflective image-pickup optical system.

A luminous flux (hereinafter referred to as object light) from an object is transmitted through the objective lens 1, enters the prism 2 through the first lens 3, and is reflected by a reflecting surface 2c to travel downward in FIG. 1. After the reflection by the reflecting surface 2c, the object light is transmitted through the second lens 4, passes through the lens system 5, and reaches the image-pickup element 6.

In the image-pickup apparatus with the reflective image-pickup optical system, the prism 2 can be rotated vertically direction to move the image-pickup range vertically. In other words, tilt imaging (tilt image pickup) can be performed without inclining the entire image-pickup apparatus vertically.

Figure 2:
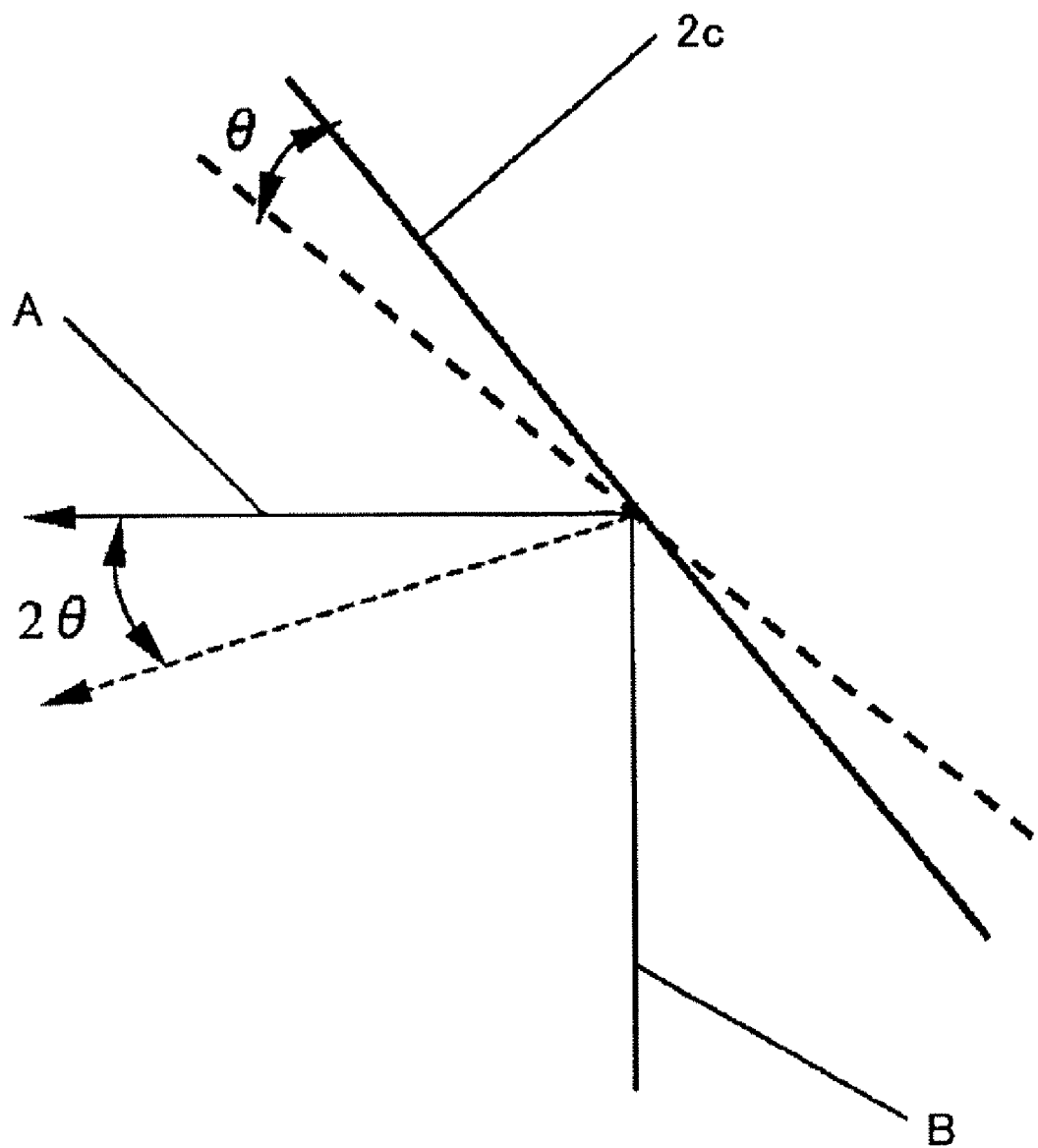
FIG. 2 is an explanatory diagram showing tilting imaging in the embodiment.

FIG. 2 shows how the image-pickup direction (the direction of the first optical axis A) is changed when the prism 2 is rotated vertically.

When the reflecting surface 2c of the prism 2 is inclined by an angle θ from the position shown by a solid line in FIG. 2 (the position at an angle of 45 degrees with respect to the horizontal direction) and rotated to the position shown by a broken line, the first optical axis A is inclined by an angle of 2θ with respect to the horizontal direction. It is thus necessary to incline the objective lens 1 by an angle of 2θ with respect to the horizontal direction to match the optical axis of the objective lens 1 with the first optical axis A. In other words, in such a reflective image-pickup optical system, the objective lens 1 needs to be rotated by an angle of 2θ when the prism 2 is rotated by an angle of θ.

In the reflective image-pickup optical system of the embodiment, the prism 2 and the objective lens 1 are rotated together. The center of the rotation is a point B4R which is placed on the second optical axis B and is the center of curvature of a curved surface (emergence surface) 4a of the second lens 4 in FIG. 1.

When the objective lens 1 and the prism 2 are rotated by an angle of θ, the first optical axis A is inclined by an angle of 2θ as described above. To match the inclined optical axis of the objective lens 1 with the first optical axis A, the objective lens 1 needs to be further rotated by an angle of θ. Thus, the objective lens 1 is rotated together with the prism 2 by an angle of θ about the point B4R (as the center of the rotation) and is further rotated by an angle of θ with respect to the prism 2 for correction of the optical axis.

The center of the rotation for the correction of the optical axis is a point A1R which is located on the first optical axis A and is the center of curvature of a curved surface (emergence surface) 1a of the objective lens 1.

Specifically, when the prism 2 is rotated by an angle of θ, the objective lens 1 is rotated together with the prism 2 by an angle of θ about the point B4R and further rotated relative to the prism 2 by an angle of θ about the point A1R, resulting in the rotation of an angle of 2θ in total. The rotation of the prism 2 and the objective lens 1 realizes an tilting operation in which the image-pickup optical axis is inclined by an angle of 2θ.

Figure 3:
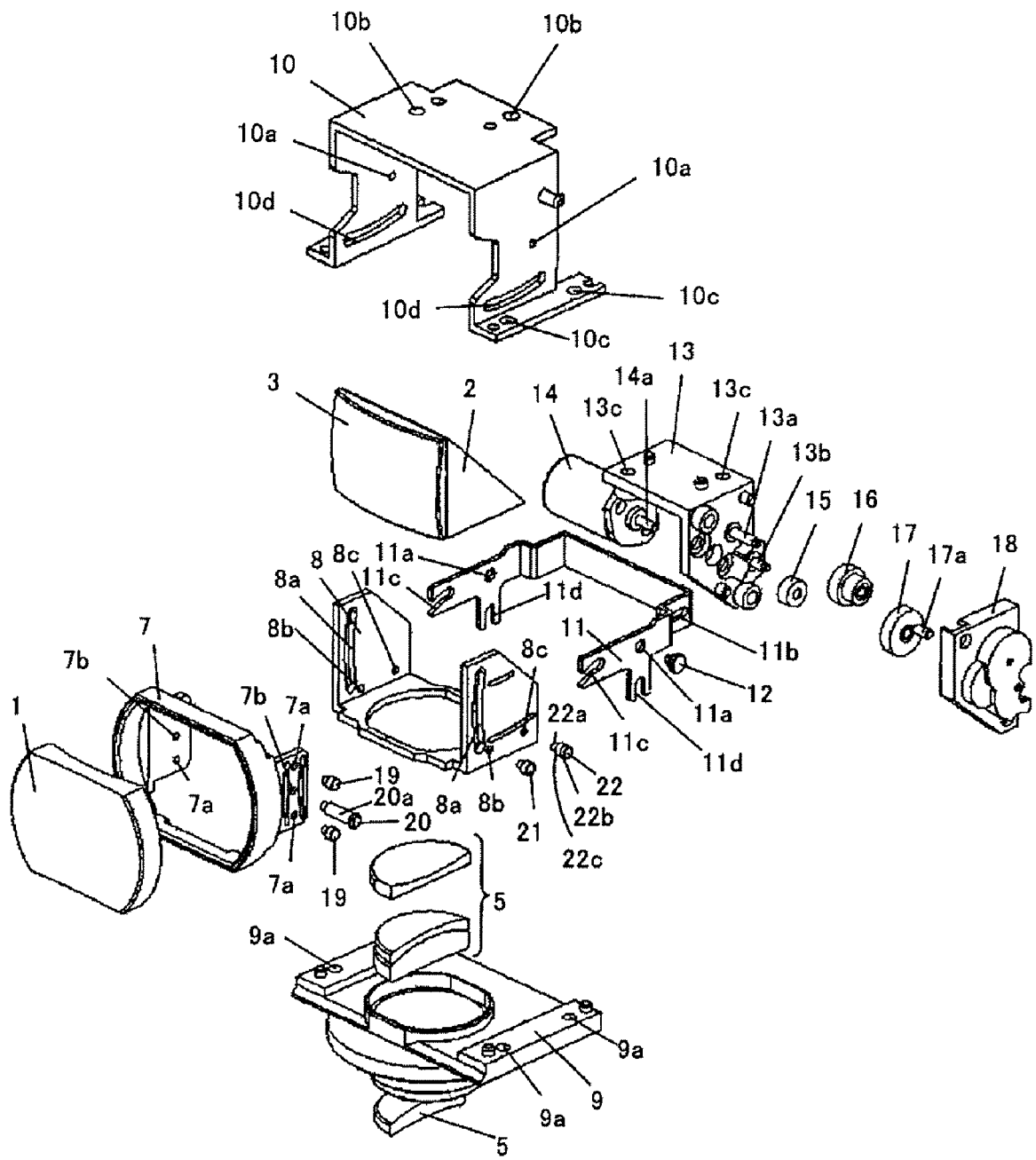
FIG. 3 is an exploded perspective view showing a prism unit including a tilting drive mechanism of the embodiment.

FIG. 3 shows an exploded view of a prism unit including a tilting drive mechanism in the embodiment. The objective lens 1 is incorporated into and held by an objective lens holder 7. The prism 2, to which the first lens 3 and the second lens 4 (not shown in FIG. 3) are bonded, is incorporated into and held by a prism holder 8. A first lens unit which is part of the lens system 5 is incorporated into and held by an image-pickup lens holder 9. In FIG. 1, the first lens unit is formed of four lens elements placed immediately below the second lens 4.

Reference numeral 10 shows a tilt base plate which is fixed to the image-pickup lens holder 9 by inserting four screws (not shown) into four hole portions 10c (only two of them are shown) and tightening them into four screw hole portions 9a (only three of them are shown) formed in the image-pickup lens holder 9. With the tilt base plate 10 attached to the image-pickup lens holder 9, the tilt base plate 10 supports the objective lens holder 7 which holds the objective lens 1 and the prism holder 8 which holds the prism 2 rotatably in the vertical direction (in the tilt direction).

Reference numeral 11 shows a tilt drive lever. The tilt drive lever 11 has two hole portions 11a formed therein for providing the center of rotation. Reference numeral 12 shows two tilt lever support pins (only one of them is shown). These tilt lever support pins 12 are inserted into the two hole portions 11a formed in the tilt drive lever 11 such that the lever 11 is rotatable about the pins 12. The tilt lever support pins 12 are pressed into two hole portions 10a formed in the tilt base plate 10, respectively, thereby rotatably supporting the tilt drive lever 11 by the tilt base plate 10.

Reference numeral 13 shows a tilt gear base plate to which a stepping motor 14 serving as an actuator is fastened by a screw, not shown. Reference numeral 15 shows a pinion gear which is fixed on a rotation shaft 14a of the stepping motor 14.

Reference numerals 16 and 17 show a first reduction gear and a second reduction gear which are rotatably attached to shaft portions 13a and 13b formed on the tilt gear base plate 13, respectively. The rotation of the stepping motor 14 is transferred to the first reduction gear 16 and the second reduction gear 17 via the pinion gear 15. The second reduction gear 17 has an engaging protrusion 17a formed integrally. The engaging protrusion 17a engages with an engaging groove portion 11b formed in the tilt drive lever 11. The tilt drive lever 11 receives force from the engaging protrusion 17a and is driven to rotate about the tilt lever support pins 12.

Reference numeral 18 shows a tilt gear retaining member which is fastened to the tilt gear base plate 13 by a screw, not shown, and rotatably supports the pinion gear 15, the first reduction gear 16, and the second reduction gear 17 between itself and the tilt gear base plate 13.

The tilt gear base plate 13, the stepping motor 14, the pinion gear 15, the first reduction gear 16, the second reduction gear 17, and the tilt gear retaining member 18 constitute a tilting reduction gear unit. The tilting reduction gear unit is secured to and held by the tilt base plate 10 by inserting two screws, not shown, into two hole portions 10b formed in the tilt base plate 10 and tightening them into two screw hole portions 13c formed in the tilt gear base plate 13.

Reference numeral 19 shows four cam pins (only two of them are shown) which are pressed into four hole portions 7a (only three of them are shown) formed in the objective lens holder 7. In assembly, two of the cam pins 19 are inserted into one of two cam groove portions 8a formed in the prism holder 8 and the other two cam pins 19 into the other cam groove portion 8a. Each of the cam groove portions 8a has a cam surface shape which allows the objective lens holder 7, that is, the objective lens 1 to rotate about the point A1R on the first optical axis A as described in FIG. 1.

Reference numeral 20 shows two objective lens drive pins (only one of them is shown) which are pressed into two hole portions 7b formed in the objective lens holder 7. Similarly to the cam pins 19, in assembly, the objective lens drive pins 20 are inserted into the two cam groove portions 8a formed in the prism holder 8. However, a drive shaft portions 20a formed on the objective lens drive pin 20 has a diameter smaller than that of the cam pin 19 to avoid interference with the cam surface of the cam groove portion 8a. As described below, the drive shaft portions 20a engage with objective lens drive cam groove portions 11c formed in the tilt drive lever 11 in assembly.

Figure 4:
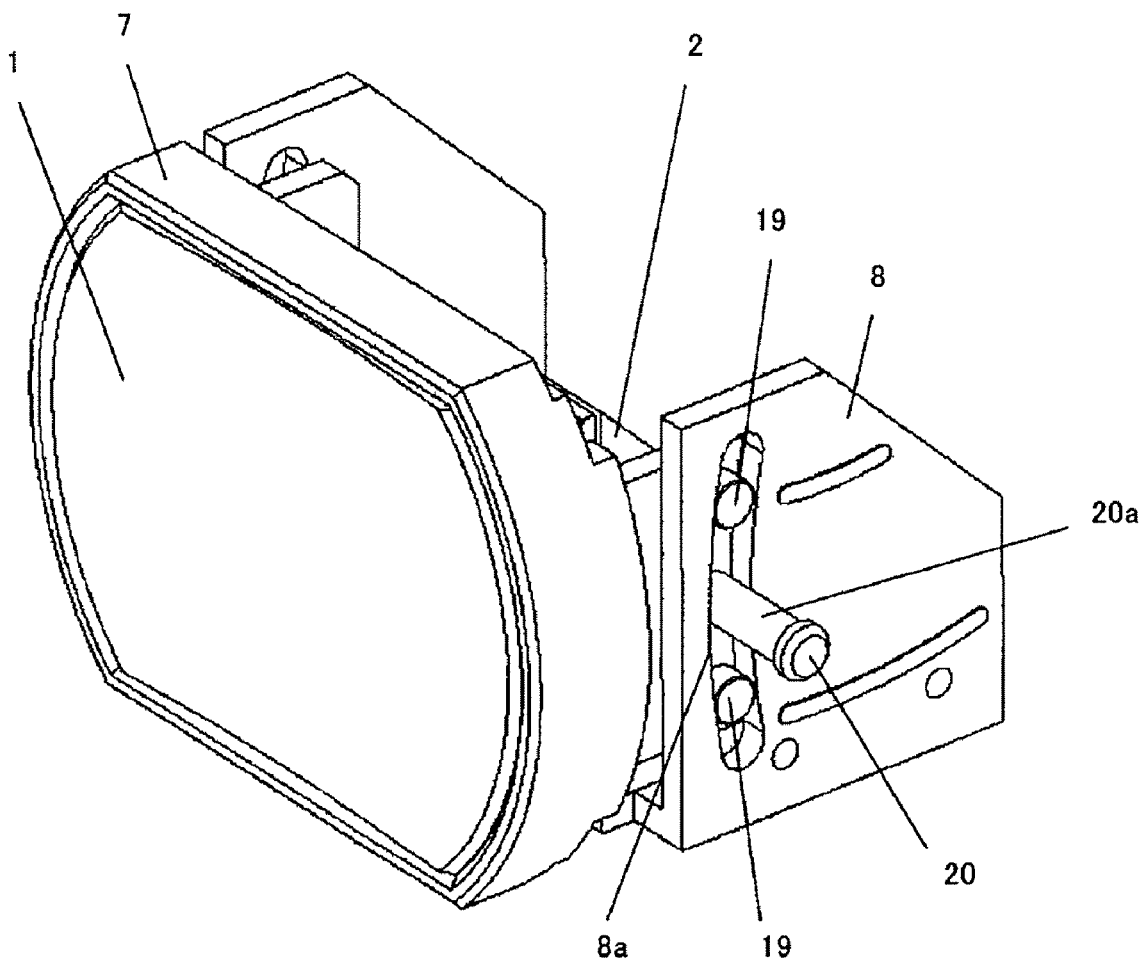
FIGS. 4 and 5 are perspective views showing the prism unit of the embodiment.

FIG. 4 shows the prism unit after the completion of the assembly of the parts so far described. As described above, the objective lens 1 can be rotated about the point A1R (see FIG. 1) located on the first optical axis A relative to the prism 2 by the engagement of the cam groove portions Ba with the cam pins 19.

In FIG. 3, reference numeral 21 shows two cam pins (only one of them is shown). The cam pins 21 are pressed into two hole portions 8b formed in the prism holder 8. In assembly, the cam pins 21 engage with two cam groove portions 10d formed in the tilt base plate 10.

Reference numeral 22 shows two cam pins (only one of them is shown). The cam pins 22 have small-diameter portions 22a which are pressed into two hole portions 8c formed in the prism holder 8. The cam pins 22 have engaging portions 22c which engage with two cam groove portions 10d formed in the tilt base plate 10. Each cam pin 22 also has a drive portion 22b with a smaller diameter than that of the engaging portion 22c. The drive portions 22b engage with prism unit drive groove portions lid formed in the tilt drive lever 11 in assembly.

The cam groove portions 10d of the tilt base plate 10 have a cam surface shape which allows the objective lens holder 7 holding the objective lens 1 and the prism holder 8 holding the prism 2 to rotate about the point B4R on the second optical axis B.

Figure 5:
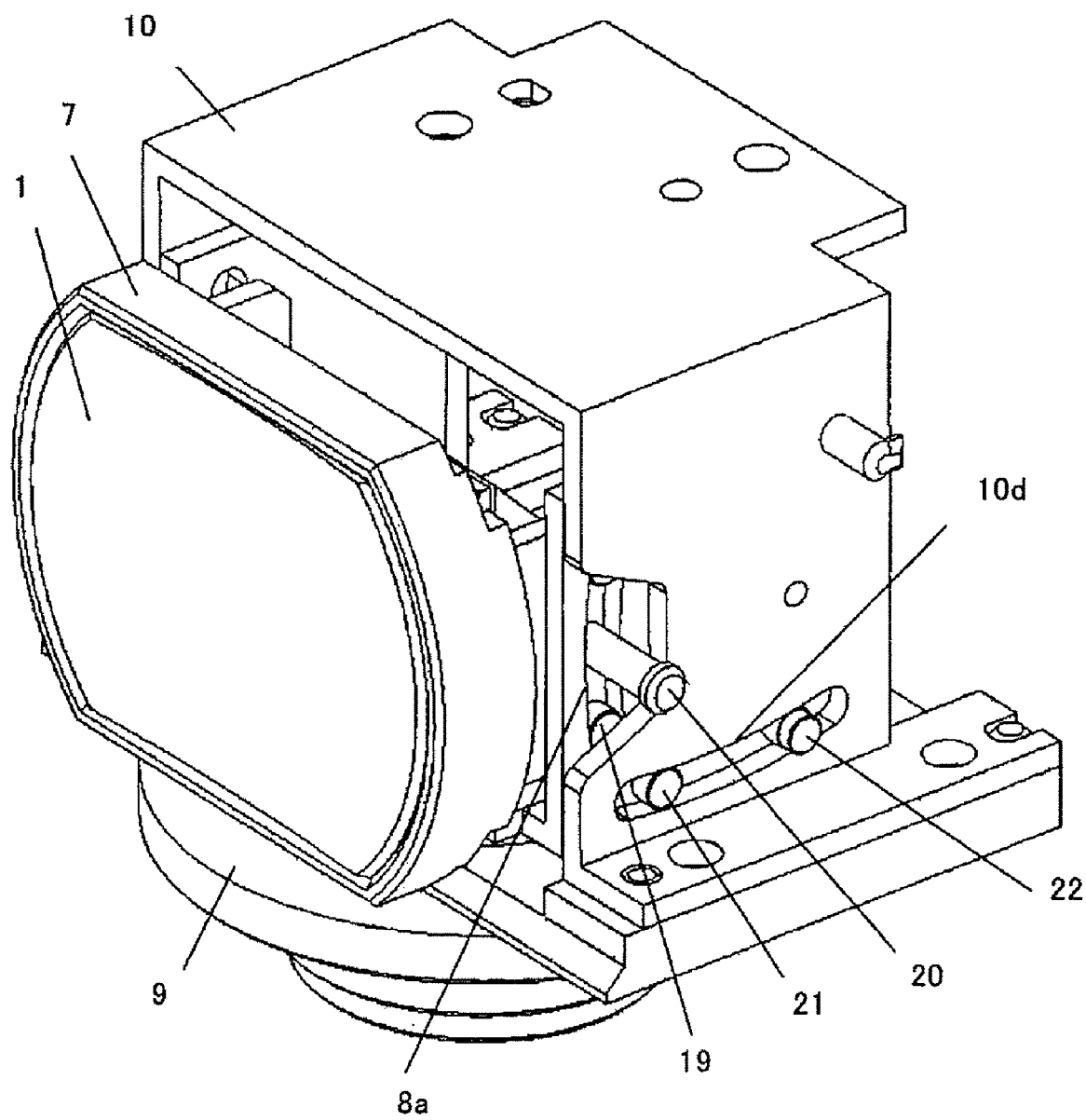

FIG. 5 shows the prism unit after the completion of the assembly of the parts so far described. As described above, the objective lens holder 7 holding the objective lens 1 can be rotated relative to the prism 2 about the point A1R on the first optical axis A. The objective lens holder 7 holding the objective lens 1 and the prism holder 8 holding the prism 2 can be rotated about the point B4R on the second optical axis B.

Figure 6:
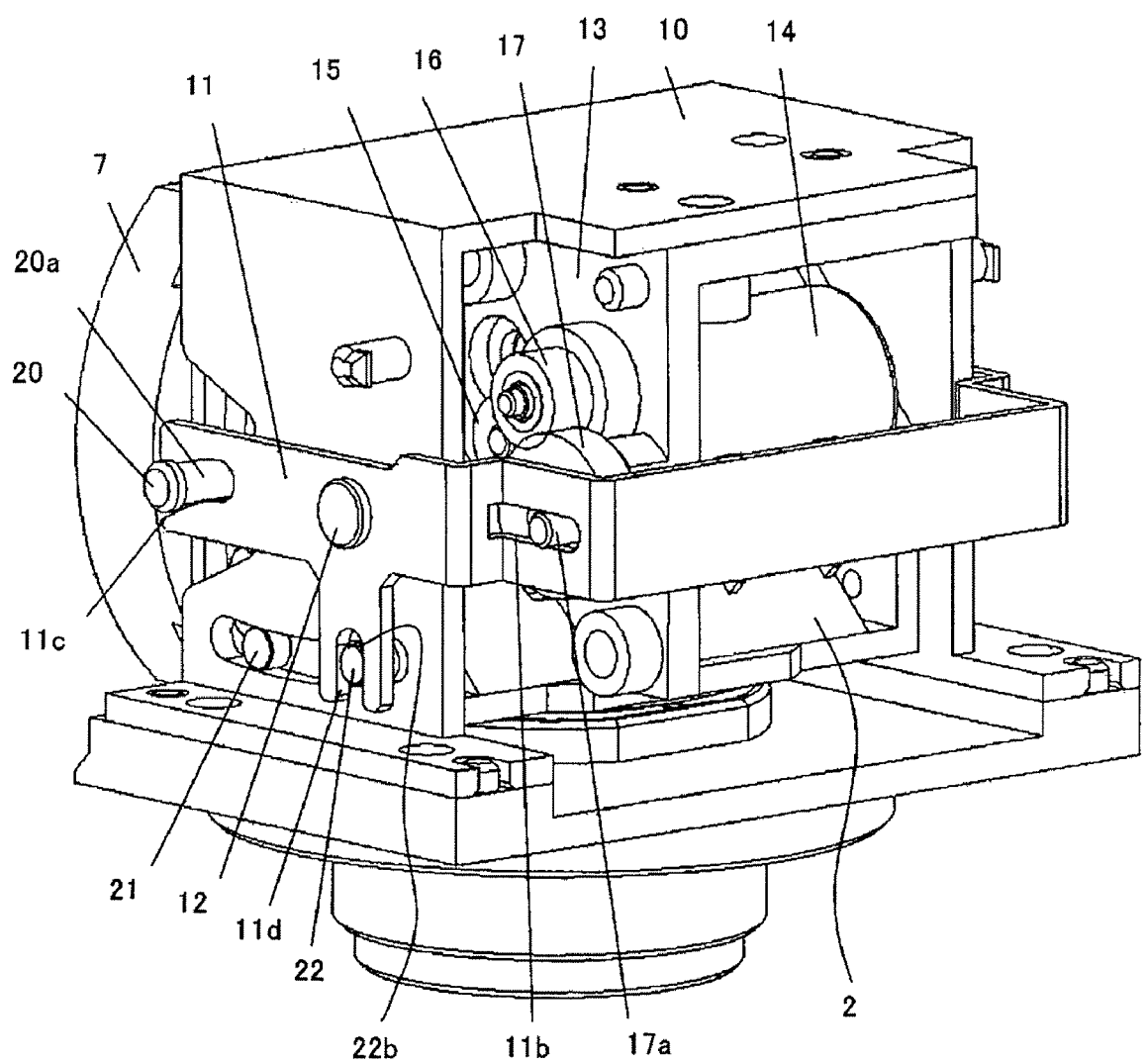
FIG. 6 is a perspective view showing the prism unit of the embodiment after the completion of the assembly.

FIG. 6 shows the prism unit after the completion of the assembly. As compared with the state shown in FIG. 5, the tilt drive lever 11 is rotatably supported by the tilt base plate 10 via the tilt lever support pins 12, and the tilting reduction gear unit is attached to the tilt base plate 10. The tilt gear retaining member 18 is not shown in FIG. 6.

As described above, the objective lens drive cam groove portions 11c are engaged with the drive shaft portions 20a of the objective lens drive pins 20, and the prism unit drive groove portions 11d are engaged with the drive portions 22b of the cam pins 22. The engaging protrusion 17a of the second reduction gear 17 is engaged with the engaging groove portion 11b of the tilt drive lever 11.

The rotation of the stepping motor 14 is transferred to the second reduction gear 17 via the pinion gear 15 and the first reduction gear 16. When the second reduction gear 17 is rotated, the engaging protrusion 17a is moved vertically in the engaging groove portion 11b while sliding in the longitudinal direction. As a result, the tilt drive lever 11 is rotated about the tilt lever support pins 12.

At this point, the action of the objective lens drive cam groove portions 11c and the prism unit drive groove portions 11d rotates the objective lens holder 7 and the prism holder 8 holding the prism 2 about the point B4R (see FIG. 1) on the second optical axis B by an angle of θ. At the same time, the objective lens holder 7 holding the objective lens 1 is further rotated relative to the prism 2 about the point A1R (see FIG. 1) on the first optical axis A by an angle of θ. As a result, when the prism 2 is rotated by an angle of θ, the objective lens 1 is rotated by an angle of θ about the point B4R together with the prism 2 and is rotated by an angle of θ about the point A1R relative to the prism. Thus, the objective lens 1 is rotated by an angle of 2θ in total to allow matching of the inclination 2θ of the first optical axis A with the inclination of the optical axis of the objective lens 1.

As shown in FIG. 6, the stepping motor 14 is housed inside the space in a triangular prism shape formed by the top surface of the tilt gear base plate 13 and the back of the reflecting surface of the prism 2. This can reduce the size of the prism unit including the stepping motor 14, and therefore, a lens barrel unit.

Figure 7:
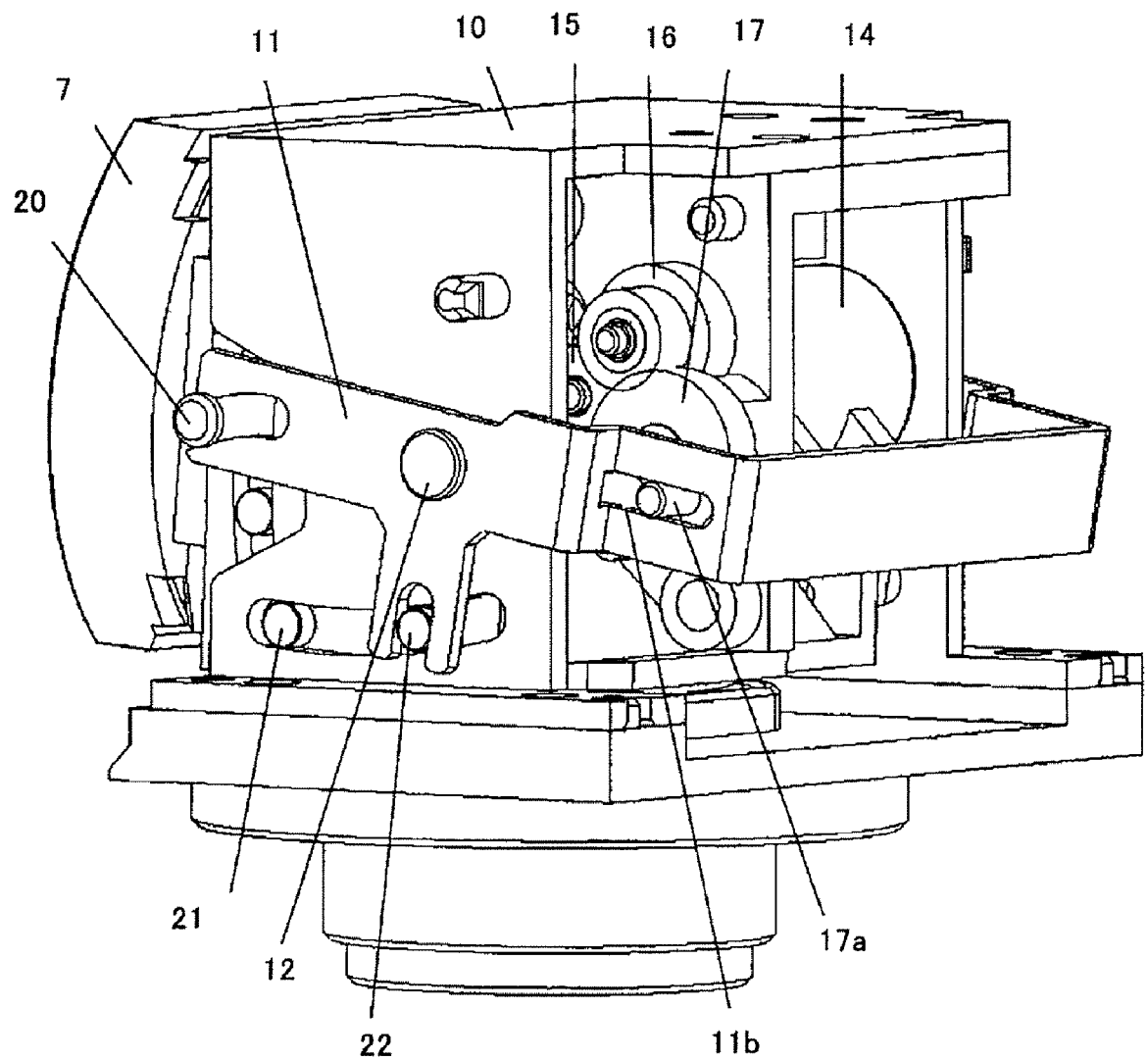
FIG. 7 is a perspective view showing tilt operation of the prism unit of the embodiment.

FIG. 7 shows how the objective lens 1 and the prism 2 are rotated by the abovementioned operation of the tilting drive mechanism.

When the stepping motor 14 is rotated clockwise in FIG. 7 from the initial state shown in FIG. 6 in which the first optical axis A extends in the horizontal direction, the pinion gear 15 is also rotated in the same direction, and that rotation is transferred to the first reduction gear 16. The first reduction gear 16 is rotated counterclockwise in FIG. 7.

The rotation of the first reduction gear 16 is transferred to the second reduction gear 17 which is then rotated clockwise. That rotation causes downward force in FIG. 7 to act on the engaging groove portion 11b of the tilt drive lever 11 from the engaging protrusion 17a formed on the second reduction gear 17. As a result, the tilt drive lever 11 is rotated clockwise in FIG. 7 about the tilt lever support pins 12.

The rotation of the tilt drive lever 11 rotates the objective lens holder 7 and the prism holder 8 holding the prism 2 about the point B4R (see FIG. 1) on the second optical axis B by an angle of θ. The objective lens holder 7 holding the objective lens 1 is further rotated relative to the prism 2 about the point A1R (see FIG. 1) on the first optical axis A by an angle of θ. In this manner, as described above, the prism 2 is rotated by an angle of θ, while the objective lens 1 is rotated by an angle of 2θ.

When the stepping motor 14 is rotated counterclockwise from the state shown in FIG. 7, the prism holder 8 and the objective lens holder 7 are rotated by an angle of θ and an angle of 2θ in the opposite directions to those described above, that is, counterclockwise, respectively. It is thus possible to match the inclination 2θ of the first optical axis A with the inclination of the optical axis of the objective lens 1.

Figure 8:
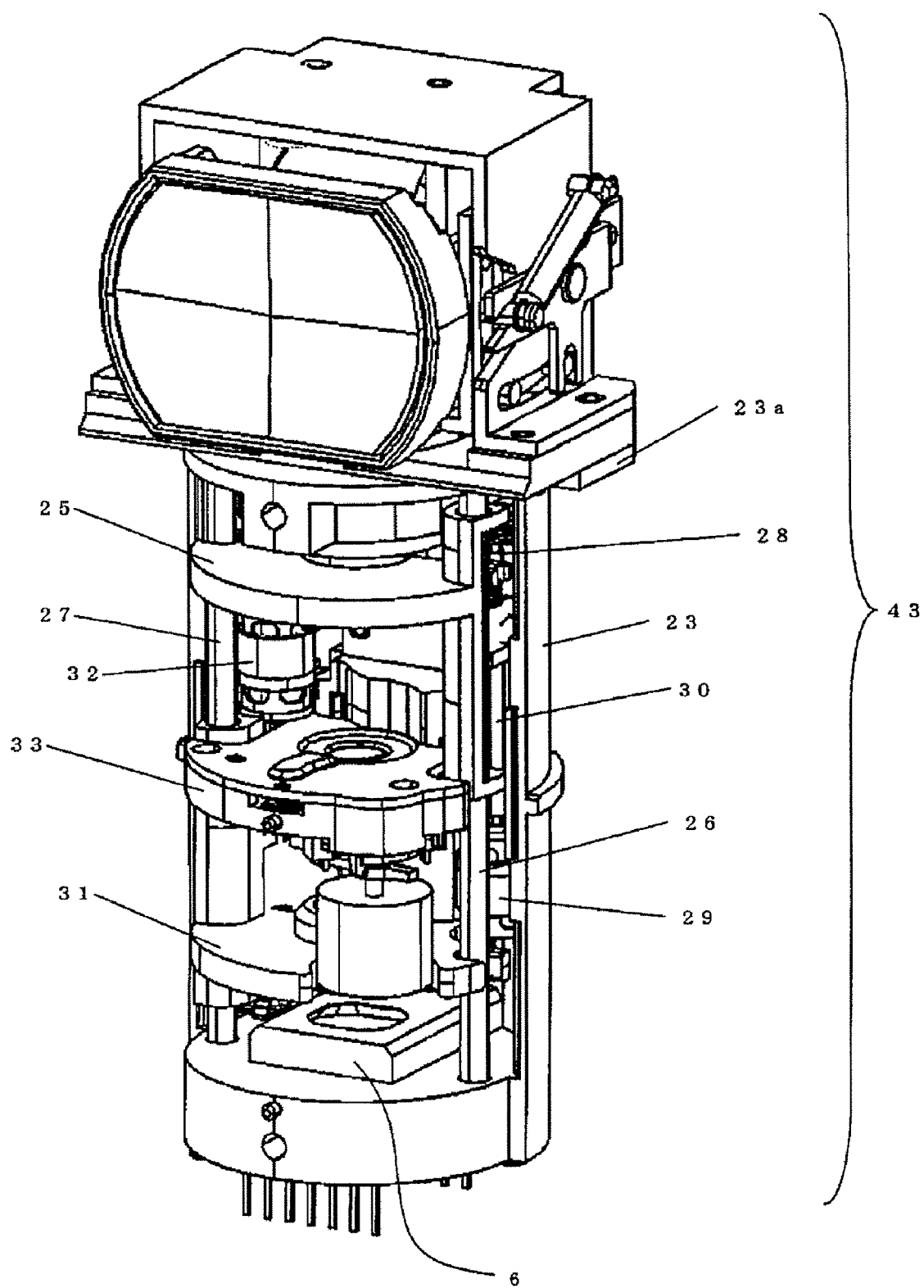
FIG. 8 is a perspective view showing a lens barrel unit of the embodiment.

FIG. 8 shows the entire structure of a lens barrel unit 43 as an image-pickup unit on which the prism unit provided with the abovementioned tilting drive mechanism is mounted and which includes a panning drive mechanism.

Figure 12:
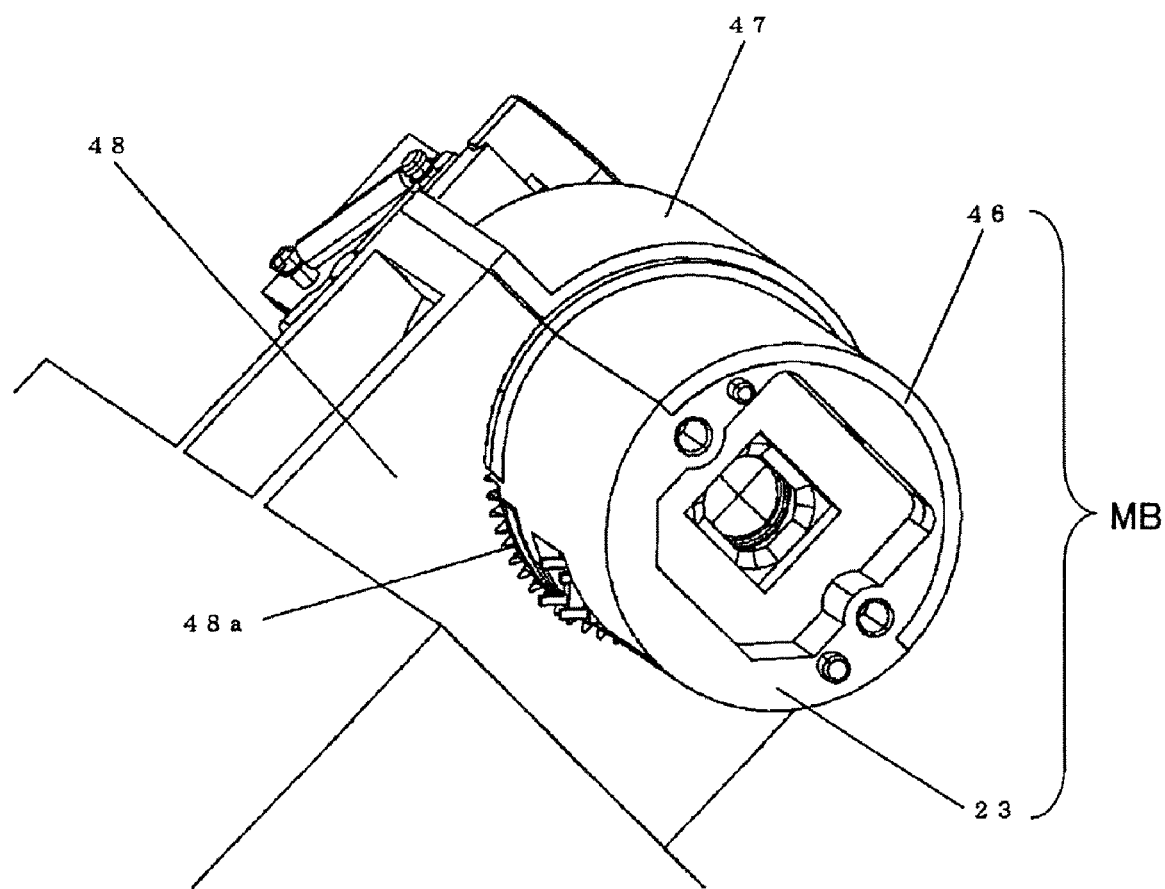
FIG. 12 is a perspective view showing the lens barrel unit of the embodiment supported such that panning thereof can be performed.

Reference numeral 23 shows an image-pickup element holder which forms part of the lens barrel unit and part of a lens barrel main body MB (see FIG. 12). The image-pickup element 6 is mounted on the image-pickup element holder 23 such that the image-pickup element 6 corresponds to the image-forming plane of the reflective image-pickup optical system. Components of the lens barrel unit, later described, are placed within the image-pickup element holder 23.

A flange portion 23a is provided at the upper end of the image-pickup element holder 23, the upper end being formed on the side opposite to the portion where the image-pickup element 6 is mounted. The prism unit including the abovementioned tilting drive mechanism is secured to the flange portion 23a by screws, not shown.

Reference numeral 25 shows a second lens holder for holding a second lens unit which forms part of the lens system 5. In FIG. 1, the second lens unit is formed of three lens elements placed immediately below the first lens unit. The second lens holder 25 is supported movably in the direction of the second optical axis B by guide bars 26 and 27 having their lower ends supported by the image-pickup element holder 23. The guide bar 27 has a function of preventing rotation of the second lens holder 25 about the guide bar 26. A rack 28 is attached to the second lens holder 25.

Reference numeral 29 shows a stepping motor which drives the second lens holder 25 in the direction of the second optical axis B. The output shaft of the stepping motor 29 is integral with a lead screw 30. The rack 28 meshes with the lead screw 30, so that the rotation of the lead screw 30 can move the second lens holder 25 along the second optical axis B. The second lens unit is a variator lens having a function of varying magnification.

Reference numeral 31 shows a fourth lens holder for holding a fourth lens unit which forms part of the lens system 5. In FIG. 1, the fourth lens unit is placed immediately above the image-pickup element 6 and is formed of a single or a plurality of lens elements.

The fourth lens holder 31 is supported movably in the direction of the second optical axis B by the guide bars 26 and 27. The guide bar 26 prevents rotation of the fourth lens holder 31 about the guide bar 27. A rack, not shown, is attached to the fourth lens holder 31. The rack meshes with a lead screw (not shown) integral with the output shaft of a stepping motor 32, so that the rotation of the lead screw can move the fourth lens holder 31 along the second optical axis B. The fourth lens unit is a compensator lens which corrects variations of the image plane associated with varied magnification and performs focus adjustment.

Reference numeral 33 shows an iris unit for controlling the amount of passing object light. The panning drive mechanism serving as a drive force transferring mechanism is attached to the iris unit 33. The panning drive mechanism rotates the entire lens barrel unit about the second optical axis B to allow pan imaging (pan image pickup).

Figure 9:
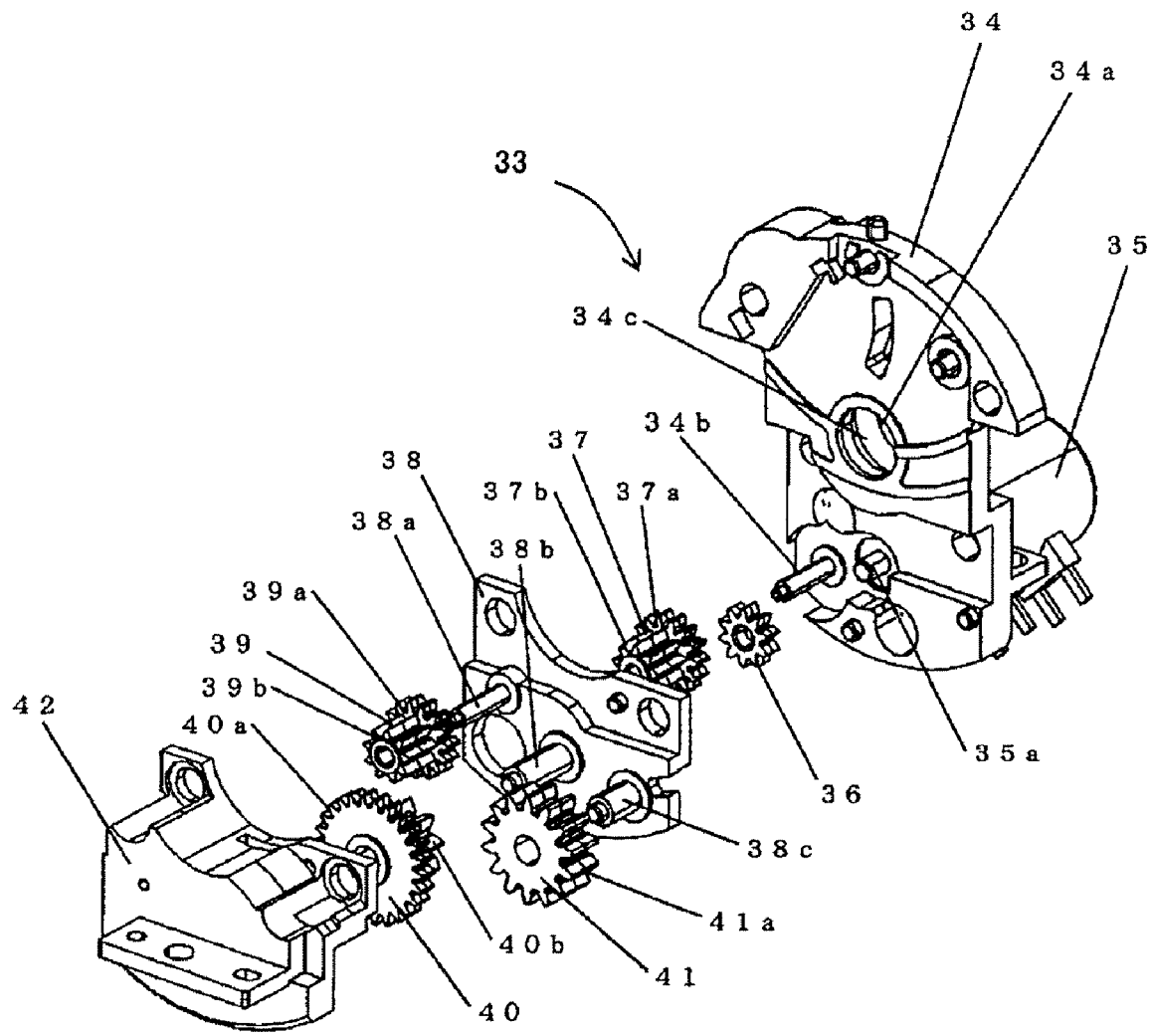
FIG. 9 is a perspective view showing a panning drive mechanism of the embodiment.

FIG. 9 shows an exploded view of the panning drive mechanism and the iris unit 33 which holds that mechanism.

Reference numeral 34 shows an iris base plate which has an opening 34a. Iris blades, not shown, move to open or close the opening 34a to control the amount of light which reaches the image-pickup element 6 from the object. This can achieve appropriate exposure.

A third lens unit which forms part of the lens system 5 is held by a lens receiver 34c formed at the back of the opening 34a in FIG. 9. In FIG. 1, the third lens unit is placed between the second lens unit and the fourth lens unit and is formed of a single or a plurality of lens elements.

Reference numeral 35 shows a stepping motor serving as an actuator fastened to the iris base plate 34 by a screw, not shown. The stepping motor 35 is housed inside the image-pickup element holder 23, that is, inside the lens barrel unit (lens barrel main body MB). Since the stepping motor 35 is relatively large as a component of the image-pickup apparatus, the placement of this motor 35 outside the lens barrel unit would increase the size of the image-pickup apparatus. However, the stepping motor 35 can be housed inside the lens barrel unit as in the embodiment to reduce the size of the image-pickup apparatus.

Reference numeral 36 shows a pinion gear which is fixed on an output shaft 35a of the stepping motor 35. Reference numeral 37 shows a first reduction gear which is attached rotatably to a shaft portion 34b formed on the iris base plate 34. A large gear portion 37a of the first reduction gear 37 meshes with the pinion gear 36.

Reference numeral 38 shows an intermediate base plate which is fastened to the iris base plate 34 by a screw, not shown, after the first reduction gear 37 is incorporated into the iris base plate 34.

Reference numeral 39 shows a second reduction gear which is attached rotatably to a shaft portion 38a formed on the intermediate base plate 38. A large gear portion 39a of the second reduction gear 39 meshes with a small gear portion 37b of the first reduction gear 37.

Reference numeral 40 shows a third reduction gear which is attached rotatably to a shaft portion 38b formed on the intermediate base plate 38. A large gear portion 40a of the third reduction gear 40 meshes with a small gear portion 39b of the second reduction gear 39.

Reference numeral 41 shows an output gear which is attached rotatably to a shaft portion 38c formed on the intermediate base plate 38. A gear portion 41a of the output gear 41 meshes with a small gear portion 40b of the third reduction gear 40.

Reference numeral 42 shows a gear retaining member which is fastened to the iris base plate 34 by a screw, not shown, after the abovementioned gears are incorporated into the iris base plate 34. This prevents the respective gears from dropping off. The iris base plate 34, the stepping motor 35, the pinion gear 36, the first to third reduction gears 37, 39, and 40, the output gear 41, and the gear retaining member 42 described above constitute a panning reduction gear unit.

The rotation of the stepping motor 35 is transferred to the pinion gear 36, the first to third reduction gears 37, 39, and 40 in this order, and finally, the increased rotation force is transferred to the output gear 41. Part of the output gear 41 protrudes from the outer circumference of the image-pickup element holder 23.

Figure 10:
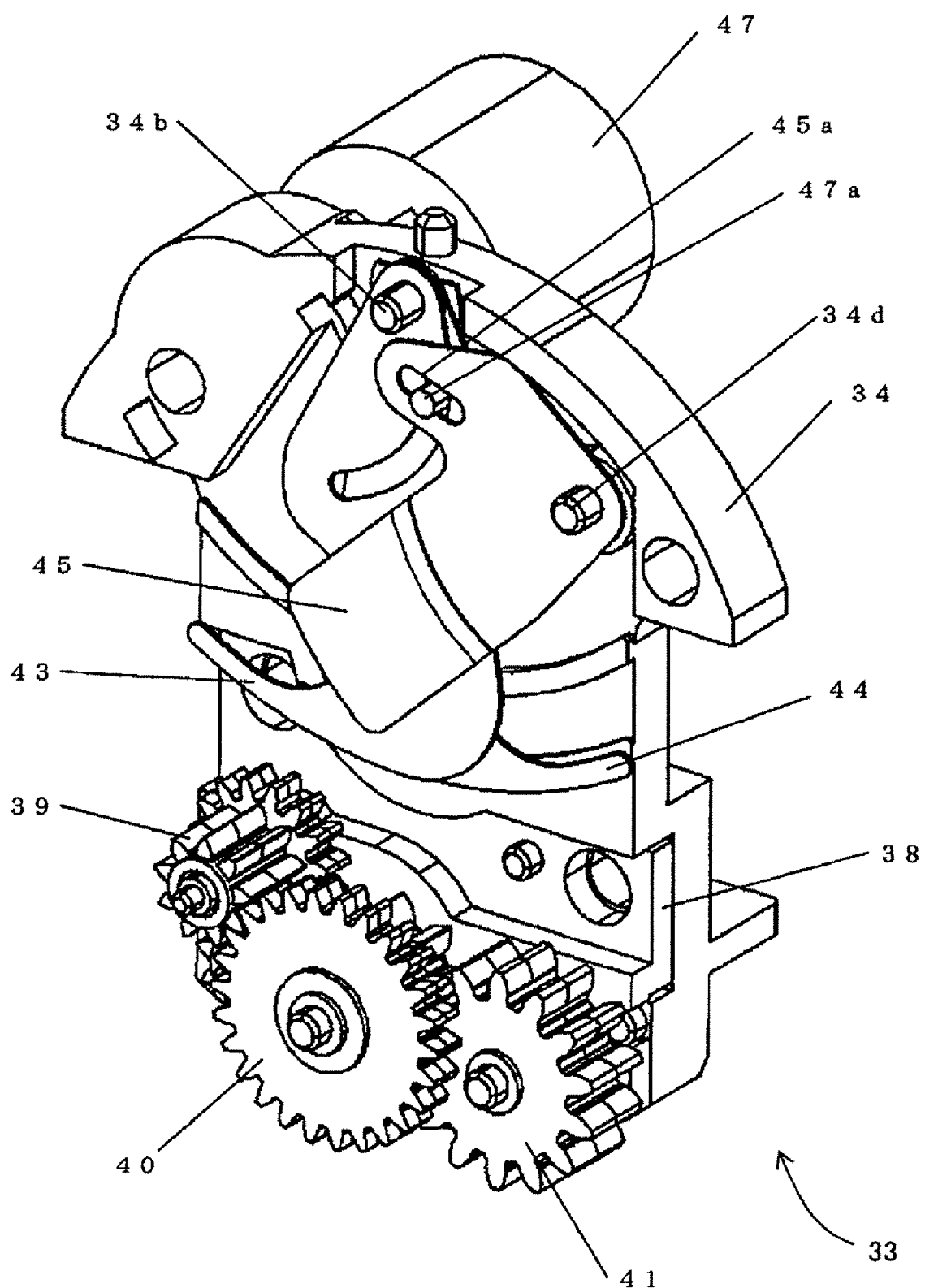
FIG. 10 is a perspective view showing an iris unit of the embodiment.

FIG. 10 shows the iris unit 33 in which the panning reduction gear unit is incorporated. Reference numeral 47 shows an actuator for driving the iris. Reference numerals 43 and 44 show iris blades which are supported rotatably by the shaft portion 34b formed on the iris base plate 34. A drive shaft 47a of the actuator 47 is engaged with an engaging hole portion formed in each of the iris blade 43 and 44. As the actuator 47 is rotated, the iris blades 43 and 44 are operated to open or close to control the covered area of the opening 34a formed in the iris base plate 34, that is, the amount of passing light.

An ND filter 45 which reduces the amount of light is supported rotatably by a shaft portion 34d formed on the iris base plate 34. The drive shaft 47a of the actuator 47 is engaged with an engaging hole portion 45a formed in the ND filter 45. As the actuator 47 is rotated, the ND filter 45 covers or uncovers the aperture opening formed by the iris blades 43 and 44 to control the amount of light passing through the aperture opening.

Figure 11:
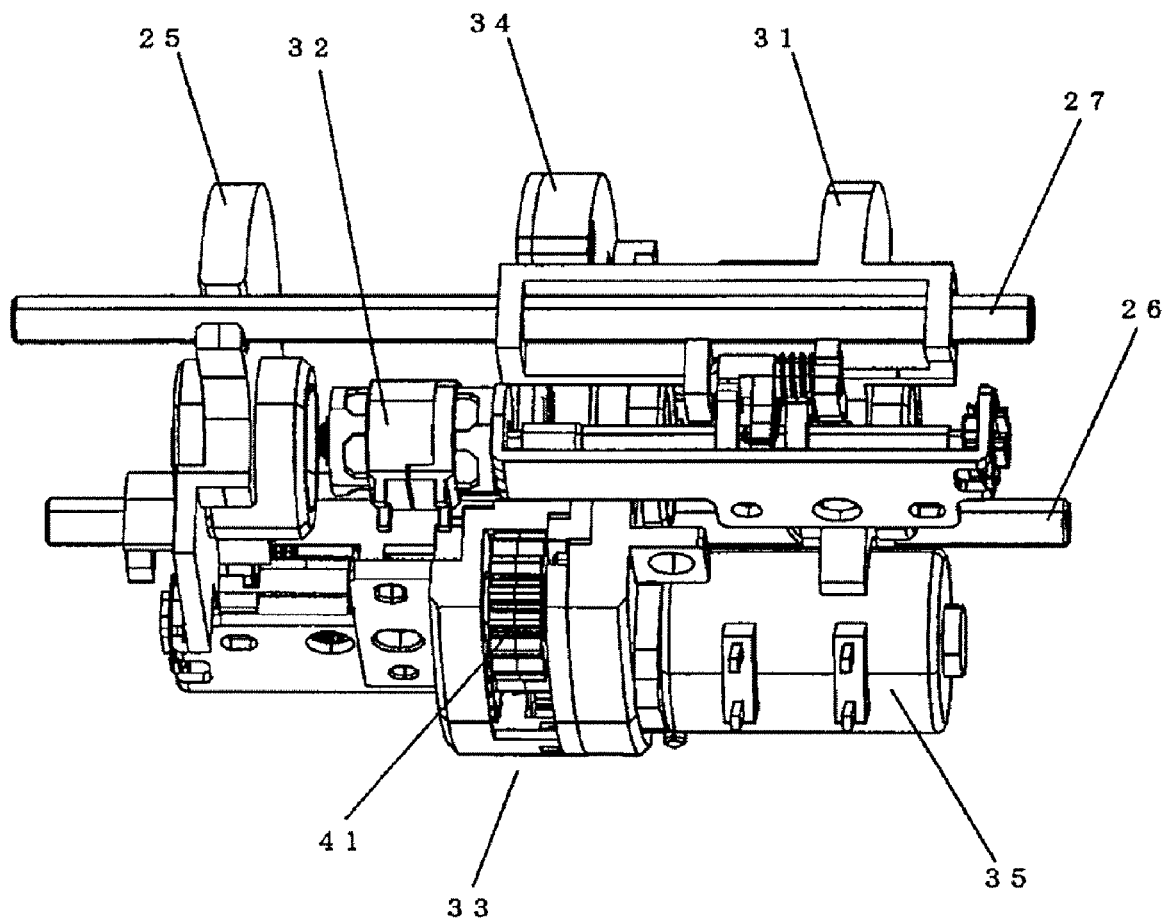
FIG. 11 is a perspective view showing a mechanism incorporated in the lens barrel unit of the embodiment.

FIG. 11 shows assembled parts incorporated in the image-pickup element holder 23 such as the iris unit 33 provided with the panning drive mechanism and the second and forth lens holders 25 and 31.

The iris unit 33 is fastened to the image-pickup element holder 23 shown in FIG. 8 by a screw, not shown. The second and fourth lens holders 25 and 31 are supported by the two guide bars 26 and 27 as described above.

When the stepping motor 35 is rotated in order to rotate the entire lens barrel unit in the panning direction, the drive force of the stepping motor 35 is transferred to the output gear 41 via the respective reduction gears as described before. Part of the output gear 41 protrudes from the outer circumference of the image-pickup element holder 23 as described above, and serves to rotate the entire lens barrel unit in the panning direction as described later.

With the structure as described above, the panning drive mechanism can be housed inside the image-pickup element holder 23 without affecting the movement of the second lens holder 25 or the fourth lens holder 31 in the direction of the optical axis. Thus, the panning drive mechanism can be realized with a small size.

FIG. 12 shows the completed lens barrel unit obtained by incorporating the respective components into the image-pickup element holder 23 and fastening an image-pickup element cover 46 forming another part of the lens barrel main body MB to the image-pickup element holder 23 by a screw, not shown.

The lens barrel unit is rotatably supported by a support member 48 fixed to a wall surface or a stage and a retaining member 47 fixed to the support member 48 by adhesion or screwing. The support member 48, the retaining member 47, and the lens barrel unit constitute the image-pickup apparatus.

The support member 48 has an internal gear 48a formed thereon. The internal gear 48a meshes with the part of the output gear 41 protruding from the outer circumference of the image-pickup element holder 23, that is, the coupling portion of the panning reduction gear unit for coupling with the support member 48.

As the output gear 41 is rotated, the entire lens barrel unit is rotated about the second optical axis B. As a result, the pan imaging can be performed.

As described above, according to the embodiment, the actuator (stepping motor 35) for driving the lens barrel unit in the panning direction is housed inside the lens barrel unit (that is, inside the lens barrel main body MB), so that the image-pickup apparatus can be reduced in size.

In other words, since the actuator for driving to rotate the image-pickup optical system is housed inside the lens barrel unit (lens barrel main body MB), it is possible to realize the image-pickup apparatus which has a smaller size than conventional apparatuses and allows tilt imaging and pan imaging.

Fixing the stepping motor 35 to the iris unit eliminates the need of a new member for securing the stepping motor 35 within the lens barrel unit, thereby reducing the size of the lens barrel unit, and therefore the image-pickup apparatus. In addition, since on the iris unit the panning reduction gear unit is placed on the side opposite to the side on which the stepping motor 35 is secured, the space in the lens barrel unit can be effectively used, which effectively reduces the size of the image-pickup apparatus.

The internal gear which meshes with the protruding part of the output gear 41 serving as the final gear of the panning reduction gear unit is formed in part of the support member 48 that surrounds the outer circumference of the lens barrel unit (lens barrel main body MB). Consequently, the coupling between the panning reduction gear unit and the support member can be realized by the compact structure.

The structure described above is merely an example of embodiments of the present invention, and the present invention is not limited to the structure. In other words, a different structure can be used as long as the structure is covered by the present invention. For example, mechanisms similar to the tilting drive mechanism and the panning drive mechanism in the embodiment may be used for panning drive and tilting drive.

Furthermore, the present invention is not limited to these preferred embodiments and various variations and modifications may be made without departing from the scope of the present invention.

This application claims foreign priority benefits based on Japanese Patent Application No. 2006-004824, filed on Jan. 12, 2006, which is hereby incorporated by reference herein in its entirety as if fully set forth herein.

What is claimed is:

1. An image-pickup apparatus comprising: an image-pickup unit configured to house an image-pickup optical system and an image-pickup element that photoelectrically coverts an optical image of an object formed by the image-pickup optical system there inside;
   a base member housed inside the image-pickup unit and configured to be provided with a light amount adjusting unit;
   a support member configured to be provided with a first coupling portion and configured to rotatably support the image-pickup unit;
   an actuator configured to rotate a second coupling portion coupling with the first coupling portion to rotationally drive the image-pickup unit with respect to the support member, the actuator being provided on the base member so as not to overlap with the light amount adjusting unit; and
   a drive force transferring mechanism formed between the actuator and the support member,
   wherein at least part of the drive force transferring mechanism is placed on a side opposite to the actuator on the light amount adjusting unit.

2. The image-pickup apparatus according to claim 1, wherein in the image-pickup unit the actuator is placed closer to the object than the image-pickup element in a direction of the optical axis of the image-pickup optical system.

3. The image-pickup apparatus according to claim 1, wherein the second coupling portion is part of a final gear of the drive force transferring mechanism, and the support member is configured to be provided with an internal gear as the first coupling portion surrounding an outer circumference of the image-pickup unit, the internal gear meshing with the final gear.

4. The image-pickup apparatus according to claim 1, wherein the image-pickup optical system includes a reflecting member.

5. The image-pickup apparatus according to claim 4, wherein the actuator rotationally drives the image-pickup unit about an optical axis of part of the image-pickup optical system from the reflecting member to the image-pickup element.

6. The image-pickup apparatus according to claim 4, further comprising an additional actuator which rotates the reflecting member, wherein the additional actuator is placed inside space formed by a back of a reflecting surface of the reflecting member and a member which holds the reflecting member.

* * * * *